US009699595B2

(12) United States Patent
Won et al.

(10) Patent No.: US 9,699,595 B2
(45) Date of Patent: Jul. 4, 2017

(54) METHOD AND WEARABLE DEVICE FOR INTERWORKING WITH A PORTABLE TERMINAL

(71) Applicant: Samsung Electronics Co., Ltd., Gyeonggi-do (KR)

(72) Inventors: Sung-Joon Won, Gyeonggi-do (KR); James Powderly, Seoul (KR); Tae-Woo Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/742,112

(22) Filed: Jun. 17, 2015

(65) Prior Publication Data

US 2015/0365784 A1 Dec. 17, 2015

(30) Foreign Application Priority Data

Jun. 17, 2014 (KR) ........................ 10-2014-0073511

(51) Int. Cl.
| | |
|---|---|
| *H04B 1/38* | (2015.01) |
| *H04M 1/00* | (2006.01) |
| *H04W 4/00* | (2009.01) |
| *H04B 1/3827* | (2015.01) |
| *H04M 1/725* | (2006.01) |
| *H04B 1/3877* | (2015.01) |
| *G06F 1/16* | (2006.01) |

(52) U.S. Cl.
CPC ............ *H04W 4/008* (2013.01); *G06F 1/163* (2013.01); *H04B 1/385* (2013.01); *H04B 1/3877* (2013.01); *H04M 1/7253* (2013.01); *H04M 1/72577* (2013.01); *H04W 4/005* (2013.01); *H04M 2250/22* (2013.01)

(58) Field of Classification Search
CPC ...... H04W 4/008; H04W 4/005; H04B 1/385; H04B 1/3877; H04M 1/7253; H04M 1/72577
See application file for complete search history.

(56) References Cited

U.S. PATENT DOCUMENTS

| | | | |
|---|---|---|---|
| 8,376,854 B2 * | 2/2013 | Ketabdar | ................ A63F 13/06 345/156 |
| 2011/0294433 A1 * | 12/2011 | Matsubara | .......... H04M 1/7253 455/41.3 |
| 2012/0208466 A1 * | 8/2012 | Park | ...................... G06F 1/1601 455/41.3 |
| 2013/0332353 A1 | 12/2013 | Aidasani et al. | |
| 2014/0132512 A1 * | 5/2014 | Gomez Sainz-Garcia | .......... G06F 3/014 345/158 |
| 2014/0160078 A1 * | 6/2014 | Seo | ......................... G06F 3/017 345/175 |
| 2014/0223359 A1 * | 8/2014 | Yamada | ................ G06F 3/0488 715/798 |
| 2015/0123894 A1 * | 5/2015 | Kim | ...................... G06F 3/017 345/156 |

* cited by examiner

*Primary Examiner* — Nguyen Vo
(74) *Attorney, Agent, or Firm* — The Farrell Law Firm, P.C.

(57) ABSTRACT

A portable terminal and method thereof are provided for interworking with a wearable device. The method includes recognizing that the wearable device is placed on the portable terminal; displaying first screen data including information of the wearable device; sensing movement of the wearable device; and displaying second screen data corresponding to the movement.

30 Claims, 14 Drawing Sheets

METHOD AND WEARABLE DEVICE FOR INTERWORKING WITH A PORTABLE TERMINAL

PRIORITY

This application claims priority under 35 U.S.C. §119(a) to Korean Patent Application Ser. No. 10-2014-0073511, which was filed in the Korean Intellectual Property Office on Jun. 17, 2014, the entire disclosure of which is hereby incorporated by reference.

BACKGROUND OF THE INVENTION

1. Field of the Invention

The present invention relates generally to an interface between a wearable device and a portable terminal.

2. Description of the Related Art

Wearable devices, e.g., smart glasses, smart rings, smart bracelets, etc., may continuously monitor, in real time, changes in the bodies of users wearing the wearable devices. However, wearable devices often do not include a display screen, which makes it difficult for users to recognize information obtained by the wearable devices.

Accordingly, a need exists for a new interface between a portable terminal and a wearable device.

SUMMARY OF THE INVENTION

Accordingly, the present invention is designed to address at least the problems and/or disadvantages described above and to provide at least the advantages described below.

According to an aspect of the present invention, a method is provided for a portable terminal to interwork with a wearable device. The method includes recognizing that the wearable device is placed on the portable terminal; displaying first screen data including information of the wearable device; sensing movement of the wearable device; and displaying second screen data corresponding to the movement.

According to another aspect of the present invention, a method is provided for a portable terminal to interwork with a wearable device. The method includes recognizing that the wearable device is placed on the portable terminal; displaying screen data including at least one of functions that are set in the wearable device and functions that are settable by the wearable device; determining whether a function that is settable by the wearable device is selected through movement of the wearable device; and transmitting, to the wearable device, added information corresponding to the selected function.

According to another aspect of the present invention, a method is provided for a wearable device to interwork with a portable device. The method includes delivering information of the wearable device to the portable terminal; receiving added information of the wearable device from the portable terminal; and controlling at least one electronic device corresponding to the added information.

According to another aspect of the present invention, a portable terminal is provided, which interworks with a wearable device. The portable terminal includes a controller configured to recognize that the wearable device is placed on the portable terminal and sense movement of the wearable device; and a screen configured to display first screen data including information of the wearable device and second screen data corresponding to the movement.

According to another aspect of the present invention, a wearable device is provided, which interworks with a portable terminal. The wearable device includes a transceiver configured to deliver information of the wearable device to the portable terminal and receive added information from the portable terminal; and a controller configured to control at least one electronic devices corresponding to the added information.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

Figure 1:
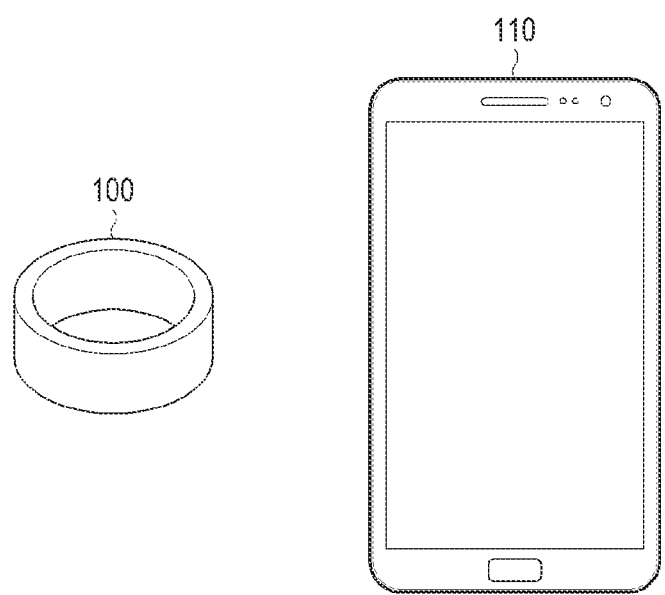
FIG. 1 illustrates a system according to an embodiment of the present invention.

Hereinafter, various embodiments of the present invention are described in detail with reference to the accompanying drawings. Detailed descriptions of well-known functions and structures incorporated herein will be omitted to avoid obscuring the subject matter of the present invention.

As the present invention allows for various changes and numerous embodiments, particular embodiments will be illustrated in the drawings and described in detail. However, the present invention is not limited to the specific embodiments and should be construed as including all changes, equivalents, and substitutions included in the spirit and scope of the present invention.

Although ordinal numbers such as "first", "second", etc., will be used to describe various components, those components are not limited by the terms. The terms are used only for distinguishing one component from another component. For example, a first component is referred to as a second component and likewise, a second component is also referred to as a first component, without departing from the teaching of the inventive concept. The term "and/or" used herein includes any and all combinations of one or more of the associated listed items.

The terminology used herein is for the purpose of describing embodiments only and is not intended to be limiting. As used herein, the singular forms are intended to include plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a commonly used dictionary have meanings coinciding with those of terms in the related technology.

FIG. 1 illustrates a system according to an embodiment of the present invention.

Referring to FIG. 1, the system includes a wearable device 100 and a portable terminal 110.

Although the portable terminal 110 is illustrated as a smart phone in FIG. 1, the portable terminal 110 is not limited thereto and me be an electronic device that is mobile and portable, e.g., a video phone, a cellular phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an electronic (E) book, a portable computer (a laptop, a tablet, etc.), a digital camera, a three-dimensional (3D) Television (TV), a smart TV, a Light Emitting Diode (LED) TV, a liquid crystal display (LCD) TV, etc.

Because the portable terminal 110 may be capable of transmitting and receiving data and performing voice and video communication, at least one screen may be provided in the portable terminal 110, and each screen may display a result corresponding to execution of at least one application.

The portable terminal 110 may also include a wirelessly connectable Bluetooth communication device, a Near Field Communication (NFC) device, a WiFi Direct communication device, and a wireless Access Point (AP).

The portable terminal 110 may be connected with another device, e.g., a smart phone, a tablet PC, a desktop PC, an input device, the wearable device 100, a camera, a server, etc, in a wired or wireless manner.

The wearable device 100 is an electronic device using voice, video, and sensors as input devices, and may collect user's action or biological information in real time. The wearable device 100 may store information obtained according to user's intention or information obtained automatically, and transmit the information to the portable terminal 110, an electronic device, or a server.

Although the wearable device 100 is illustrated herein as a smart ring, the present the wearable device 100 is not limited to the smart ring. For example, the wearable device 100 may include smart swimming goggles, a smart bracelet, a smart arm band, a smart pendant, a smart watch, etc.

The wearable device 100 interworks with the portable terminal 110 through an embedded sensor. For example, the portable terminal 110 recognizes the wearable device 100 and displays first screen data including information of the wearable device 100. Thereafter, the portable terminal 110 senses movement of the wearable device 100, which is caused by a user, and displays second screen data corresponding to the movement. The first screen data may include a list of set functions of the portable terminal 110, and the second screen data may include a screen image in which a set function is selected from the list. Accordingly, the wearable device 100 can be used to control the portable terminal 110, such that the portable terminal 110 operates in a preset way corresponding to movement of the wearable device 100.

According to an embodiment of the present invention, the portable terminal 110 obtains update information of the wearable device 100 from a server, and delivers the update information to the wearable device 100.

Figure 2:
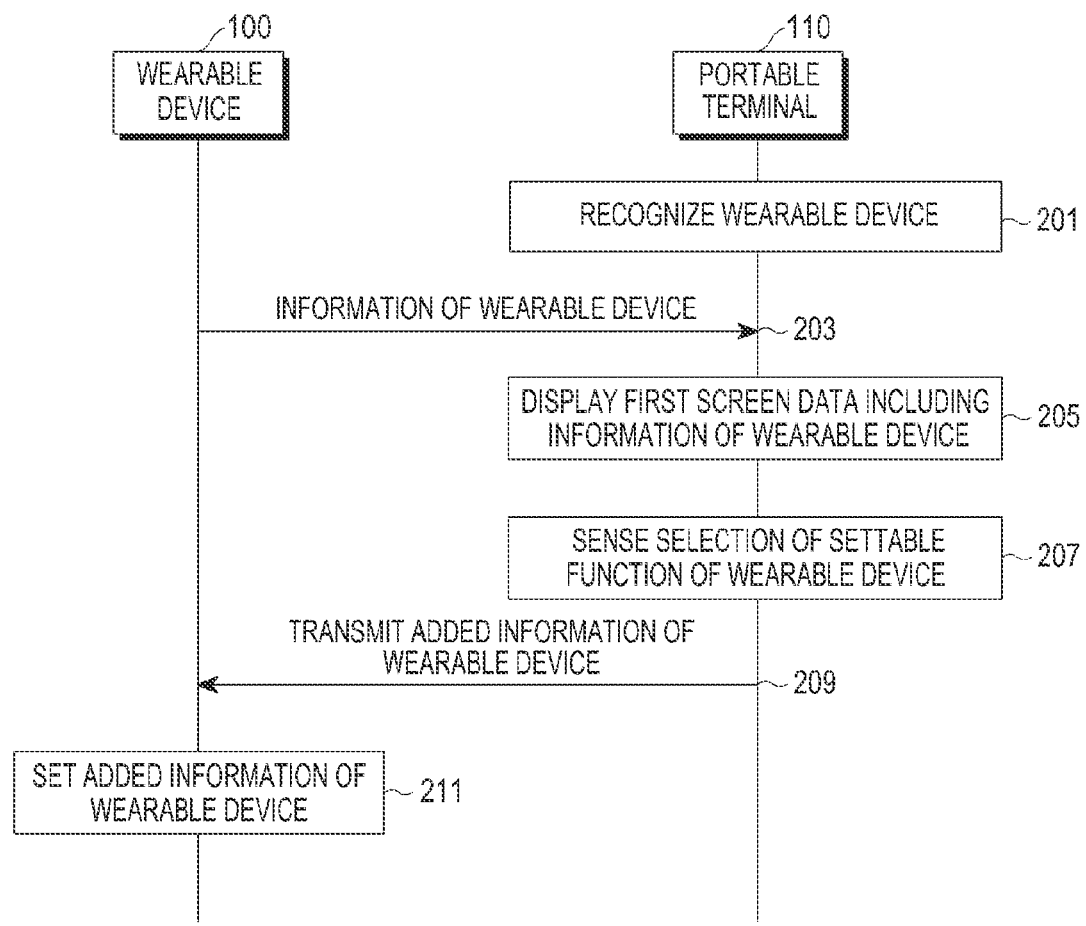
FIG. 2 is a signal flow diagram illustrating an operation between a wearable device and a portable terminal according to an embodiment of the present invention.

FIG. 2 is a signal flow diagram, illustrating an operation between a wearable device and a portable terminal according to an embodiment of the present invention.

Referring to FIG. 2, in step 210, the portable terminal 110 recognizes the wearable device 100. For example, the portable terminal 110 recognizes when the wearable device 100 is placed on a screen of the portable terminal 110. As another example, the portable terminal 110 recognizes when the wearable device 100 is placed within a certain distance from the portable terminal 110 using NFC or Bluetooth, without direct contact.

In step 203, the wearable device 100 transmits information of the wearable device 100 to the portable terminal 110. The information of the wearable device 100 may include at least one of information obtained by the wearable device 100 and information about functions set in the wearable device 100. For example, the obtained information includes an image captured by the wearable device 100, a heart rate, calories consumed by the user, etc.

The information about the functions set in the wearable device 100 may include a list of electronic devices that may be controlled by a smart ring, and information about functions for controlling the electronic devices, if the wearable device 100 is the smart ring. For example, the information of the wearable device 100 may include a list of at least one other electronic device that may be controlled by the portable terminal 110 or a list of functions set in the portable terminal 110.

As another example, if the wearable device 100 does not include a battery and a communication unit, the portable terminal 110 recognizes the wearable device 100 using a sensor or an NFC tag embedded in the wearable device 100 and obtains information of the wearable device 100.

In step 205, the portable terminal 110 displays first screen data including the information of the wearable device 100. The first screen data may include functions that are set in the wearable device 100 and/or functions that are settable by the wearable device 100. For example, the set functions may include a list of peripheral electronic devices that are controllable by the wearable device 100, and the settable functions may include a list of electronic devices that are additionally controllable by the portable terminal 110 from the wearable device 100.

Alternatively, the set functions may include a function for controlling a peripheral electronic device by the wearable device 100. For example, if the peripheral electronic device is a TV, the function may be volume control or channel change of the TV.

In step 207, the portable terminal 110 senses selection of a function that is settable by the wearable device 100. The function may be selected for the wearable device 100 to control an added peripheral electronic device or a function that is to control the peripheral electronic device in detail. For example, the portable terminal 110 may provide a radio as an added peripheral device that the wearable device 100 may control. Thus, when the provided radio is selected by the user, the portable terminal 110 senses that a function that is settable by the wearable device 100 is selected in step 207.

In step 209, the portable terminal 110 transmits added information of the wearable device 100 to the wearable device 100. For example, if a TV is the only current peripheral electronic device that is controllable by the wearable device 100, the portable terminal 110 may recognize the radio as an additionally controllable electronic device by the wearable device 100. The portable terminal 110 transmits information for the wearable device 100 to control the radio, to the wearable device 100. The information for controlling the radio may be included in the added information of the wearable device 100.

In step 211, the wearable device 100 receives and sets the added information. For example, the wearable device 100 may perform a setting to control the radio, as described above.

Figure 3:
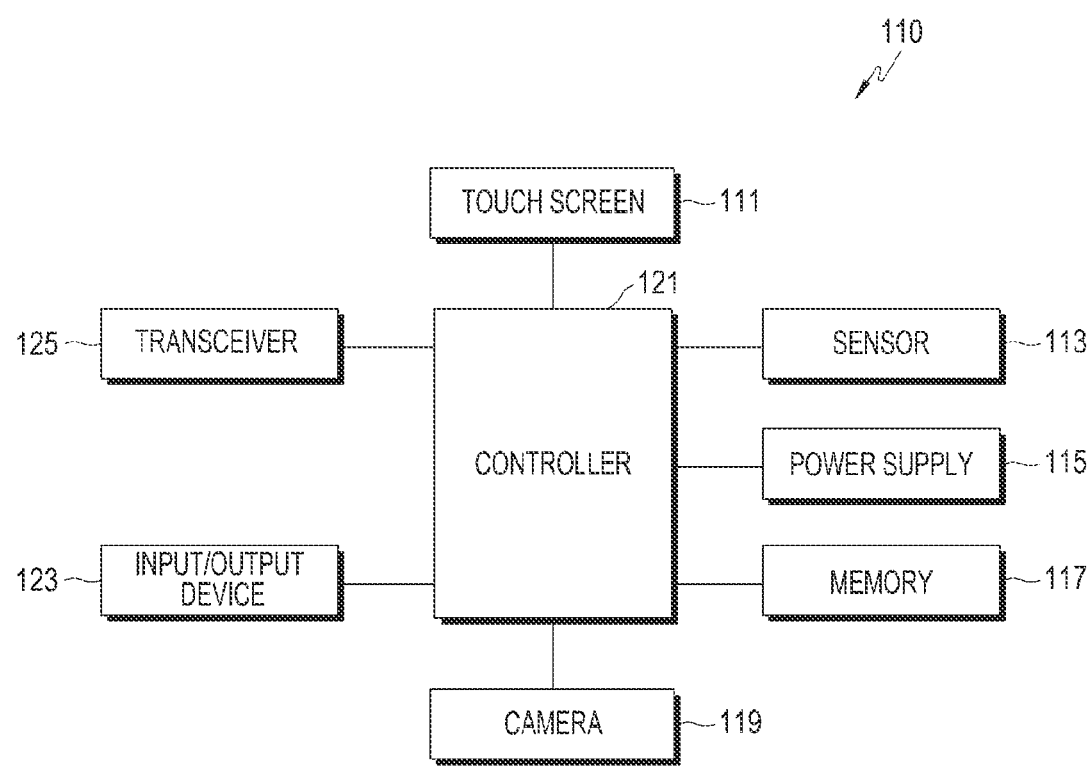
FIG. 3 is a block diagram illustrating a portable terminal according to an embodiment of the present invention.

FIG. 3 is a block diagram illustrating a portable terminal 110 according to an embodiment of the present invention.

Referring to FIG. 3, the portable terminal 110 includes a touch screen 111, a sensor 113, a power supply 115, a memory 117, a transceiver 125, an input/output device 123, a camera 119, and a controller 121.

The touch screen 111 receives touches and/or gestures from a user (for example, a finger, a thumb a stylus pen, or an electronic pen). The touch screen 111 transmits an analog signal corresponding to an input to the controller 121.

According to an embodiment of the present invention, the touch screen 111 recognizes contact by a wearable device 100. The touch screen 111 may also output different values (for example, a current value) corresponding to movement of the wearable device 100.

Depending on the capability or structure of the portable terminal 110, the proximity of wearable device 100 to the touch screen 111 may be detected without actual contact.

The sensor 113 may include a pressure sensor, a sensor for sensing other devices, and a sensor for recognizing the wearable device 100 and sensing movement of the wearable device 100.

According to an embodiment of the present invention, the portable terminal 110 recognizes that the wearable device 100 is placed on the touch screen 111 of the portable terminal 110 using a pressure sensor and interworks a sensor embedded in the wearable device 100 to sense a rotation angle the wearable device 100 moves.

The transceiver 125 may include a mobile communication module a sub communication module, a Wireless Local Area Network (WLAN) module, and a short-range communication module according to a communication scheme, a transmission distance, and a type of data transmitted and received. The mobile communication module allows the portable terminal 110 to be connected with an external device through mobile communication by using one or more antennas under control of the controller 121. The mobile communication module may transmit/receive a voice call, a video call, a Short Messaging Service (SMS) or a Multimedia Messaging Service (MMS) to/from another electronic device.

The sub communication module may include at least one of the WLAN module and/or the short-range communication module. The sub communication module transmits and receives a control signal to and from an input unit.

The WLAN module may be connected to the Internet in a place where a wireless AP is installed, under control of the controller 121. The WLAN module supports the wireless LAN standard IEEE802.11x of the Institute of Electrical and Electronics Engineers (IEEE). The short-range communication module may wirelessly perform short-range communication between the portable terminal 110 and an external electronic device under control of the controller 121. The short-range communication may include Bluetooth, infrared data association (IrDA), WiFi-Direct communication, NFC communication, etc. The portable terminal 110 may include at least one of the mobile communication module, the WLAN module, and the short-range communication module according to capability. The portable terminal 110 may include a combination of the mobile communication module, the WLAN module, and the short-range communication module according to capability.

According to various embodiments of the present invention, at least one of or a combination of the mobile communication module, the WLAN module, the screen, and the short-range communication module will be referred to as the transceiver 125.

The transceiver 125 obtains update information of the wearable device 100 from the server and transmits information received from the wearable device 100 to the server.

The input/output device 123 may include at least one of buttons (a microphone, a speaker, a vibration motor, a connector, and a keypad. Each component included in the input/output device 123 may be displayed on the touch screen 111 to perform an input/output function or to be controlled. The input/output device 123 may also include at least one of an earphone connecting jack and an input unit. However, it should be noted that the input/output device 123 is not limited to those examples, and a cursor control such as, for example, a mouse, a track ball, a joy stick, or a cursor direction key may be provided to control movement of a cursor on the touch screen 111 through communication with the controller 121.

In the input/output device 123, the keypad receives a key input from the user for control of the portable terminal 110. The keypad may include a physical keypad formed in the portable terminal 110 or a virtual keypad displayed on the touch screen 111. The physical keypad formed in the mobile portable terminal 110 may be excluded according to the capability or structure of the portable terminal 110.

The input/output device 123 senses a user input, after the wearable device is placed on the screen, and performs a corresponding input/output function.

The memory 117 stores a signal, an object, or data that is input/output corresponding to operations of the transceiver 125, the input/output device 123, the touch screen 111, and the power supply 115, under control of the controller 121. The memory 117 stores a control program and applications for control of the portable terminal 110 or the controller 121. The memory 117 may include a non-volatile memory, a volatile memory, a Hard Disk Drive (HDD), or a Solid State Drive (SSD). The memory 117 also includes a machine (for example, computer) readable medium, and the term "machine-readable medium" includes a medium for providing data to the machine to allow the machine to execute a particular function. The memory 117 may include non-volatile media or volatile media. Such a medium is of a tangible type so that commands delivered to the medium can be detected by a physical tool which reads the commands with the machine.

The memory 117 stores a rotation angle that is set corresponding to movement of the wearable device 100, and stores information included in screen data displayed on the touch screen 111, after the wearable device 100 is recognized. The memory 117 may also store information included in the screen data, which has changed due to user's setting, and may also store mapping between movement of the wearable device 100 and a function that is settable by the portable terminal 110.

The power supply 115 supplies power to one or more batteries provided in a housing of the portable terminal 110 under control of the controller 121. The one or more batteries supply power to the portable terminal 110. The power supply 115 supplies power input from an external power source through a wired cable connected with a connector to the portable terminal 110. The power supply 115 may also supply power, which is wirelessly input from an external power source using a wireless charging technique, to the portable terminal 110.

The power supply 115 may also supply power to the wearable device 100 by using the wireless charging technique.

The camera 119 includes, for example, a front camera for photographing or performing video communication.

The camera 119 may recognize the wearable device 100 and obtain information about movement of the wearable device 100.

The controller 121 may include a Central Processing Unit (CPU), a Read Only Memory (ROM) in which a control program for control of the portable terminal 110 is stored, and a Random Access Memory (RAM) that stores a signal or data input from the outside of the portable terminal 110 or is used as a memory region for a task performed in the portable terminal 110. The CPU may include a single core, a dual core, a triple core, or a quad core processor.

The controller 121 controls at least one of the touch screen 111, the transceiver 125, the input/output device 123, the memory 117, the power supply 115, the sensor 113, and the camera 119.

According to an embodiment of the present invention, the controller 121 recognizes when the wearable device 100 placed on the portable terminal 110, senses movement of the wearable device 100, displays the first screen data including information of the wearable device 100, and displays the second screen corresponding to the movement on the screen 111. As described above, the first screen data may include a screen image indicating functions set in the wearable device 100, and the second screen data may include a screen image indicating functions that are set in or are settable by the wearable device 100.

The controller 121 determines whether one of the settable functions included in the second screen data is selected, and controls the transceiver 125 to transmit added information including information about the selected function to the wearable device 100.

The controller 121 recognizes the wearable device 100 and displays the first screen data indicating a lock state of the portable terminal 110 on the touch screen 111.

The controller 121 displays the second screen data indicating release of the lock state (or unlock state) of the portable terminal 110 on the touch screen 111, corresponding to the movement.

If the portable terminal 110 is in the lock state, upon recognizing the wearable device 100, the controller 121 displays the first screen data indicating the unlock state of the portable terminal 110 on the touch screen 111, and displays the second screen data indicating setting of the lock state (or lock state) of the portable terminal 110 on the touch screen 111, corresponding to the movement.

The controller 121 controls another electronic device according to movement of the wearable device 100, and displays the second screen data indicating a state of the another electronic device on the touch screen 111.

The controller 121 senses a rotation angle through which the wearable device 100 moves using at least one sensor embedded in the wearable device 100, and compares the sensed rotation angle with a set rotation angle to sense movement of the wearable device 100.

In another example, the controller 121 displays screen data including the functions that are set in the wearable device 100 and at least one of the functions that are settable by the wearable device 100 on the touch screen 111, determines whether one of the settable functions is selected, and controls the transceiver 125 to transmit added information corresponding to the selected function to the wearable device 100.

The controller 121 controls a pressure sensor of the portable terminal 110 to recognize that the wearable device 100 is placed on the portable terminal 110.

The controller 121 also obtains update information of the wearable device 100 from a server and controls the update information to be delivered to the wearable device 100.

Figure 4A:
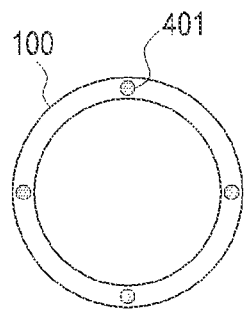
FIGS. 4A to 4C illustrate wearable devices and sensors embedded in the wearable devices according to various embodiments of the present invention.
Figure 4B:
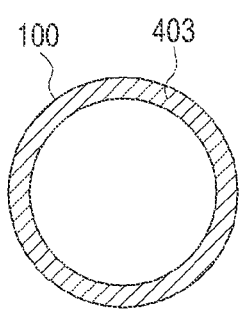
Figure 4C:
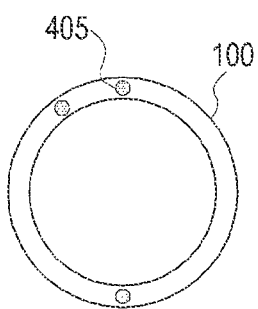

FIGS. 4A to 4C illustrate wearable devices and sensors embedded in the wearable devices according to various embodiments of the present invention.

Referring to FIG. 4A, four sensors 401 are embedded in the wearable device 100. Using the four sensors 401, the portable terminal 110 recognizes that the wearable device 100 is placed on the touch screen 111 of the portable terminal 110 and senses subsequent movement of the wearable device 100.

More specifically, using the four sensors 401, the portable terminal 110 may detect a rotation angle corresponding to the movement of the wearable device 100 by the user. That is, the four embedded sensors 401 allow the portable terminal 110 to sense a rotation angle or movement of the wearable device 100.

Referring to FIG. 4B, a sensor 403 is embedded on at least one of a top surface and a bottom surface of the wearable device 100. Using the sensor 403, the portable terminal 110 may recognize when the wearable device 100 is placed on the touch screen 111 and sense subsequent movement of the wearable device 100.

More specifically, using the sensor 403, the portable terminal 110 detects a rotation angle corresponding to the movement of the wearable device 100 by the user. That is, the sensor 403 allows the portable terminal 110 to sense a rotation angle or movement of the wearable device 100.

Referring to FIG. 4C, three sensors 405 are embedded on the wearable device 100. Using the three sensors 405 embedded on the wearable device 100, the portable terminal 110 recognizes when the wearable device 100 is placed on the touch screen 111 of the portable terminal 110 and senses subsequent movement of the wearable device 100.

More specifically, using the three sensors 405, the portable terminal 110 senses a rotation angle corresponding to the movement of the wearable device 100 by the user. That is, the three embedded sensors 405 allow the portable terminal 110 to sense a rotation angle or movement of the wearable device 100.

As described above, the wearable device 100 may include at least one sensors embedded therein, and the positions of the sensors may be set variously, taking the appearance and capability of the wearable device 100 into account.

Figure 5:
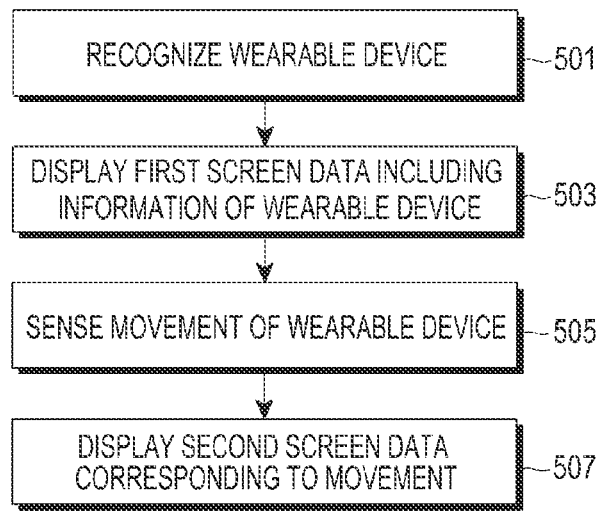
FIG. 5 is a flowchart illustrating an operation of a portable terminal according to an embodiment of the present invention.

FIG. 5 is a flowchart illustrating an operation of a portable terminal according to an embodiment of the present invention.

Referring to FIG. 5, in step 501, the portable terminal 110 recognizes the wearable device 100. For example, using a pressure sensor embedded in the portable terminal 110, the portable terminal 110 may recognize that the wearable device 100 is placed on a display of the portable terminal 110. As another example, using a sensor embedded on the wearable device 100, the portable terminal 110 may recognize that the wearable device 100 is placed on the display of the portable terminal 110.

In step 503, the portable terminal 110 displays first screen data including information of the wearable device 100. The information of the wearable device 100 may include, for example, at least one of information obtained by the wearable device 100 and information about functions that are set in the wearable device 100. The information obtained by the wearable device 100 may include an image captured by the wearable device 100, a heart rate and user-consumed calories measured by the wearable device 100, etc., depending on a type of the wearable device 100.

For example, the information about the functions set in the wearable device 100 may include a list of electronic devices that are controllable by a smart ring and information about functions that are controllable, if the wearable device 100 is the smart ring. The list of the electronic devices may include a TV, a radio, and living room lights that are controllable by the smart ring. The controllable functions may include channel change and volume control of the TV, if the smart ring is set to control the TV.

The first screen data may include a screen image showing the functions set in the wearable device 100. For example, the first screen data may include information such as an image captured by the wearable device 100 and a heart rate and user-consumed calories measured by the wearable device 100, and may include at least one of list information regarding electronic devices such as a TV, a radio, and living room lights and function information regarding the functions that are controllable by the wearable device 100, such as channel change and volume control of the TV.

In step 505, the portable terminal 110 senses movement of the wearable device 100. For example, the portable terminal 110 senses a rotation angle that the wearable device 100 moves, using at least one sensor embedded in the wearable device 100.

In step 507, the portable terminal 110 displays second screen data corresponding to movement of the wearable device 100. For example, the portable terminal 110 compares the sensed rotation angle with the set rotation angle to determine the second screen data to be displayed. For example, the second screen data may include a screen image indicating functions that are set in or settable by the wearable device 100.

FIGS. 6A to 6E illustrate first screen data and second screen data that corresponds to movement of a wearable device according to an embodiment of the present invention.

Figure 6A:
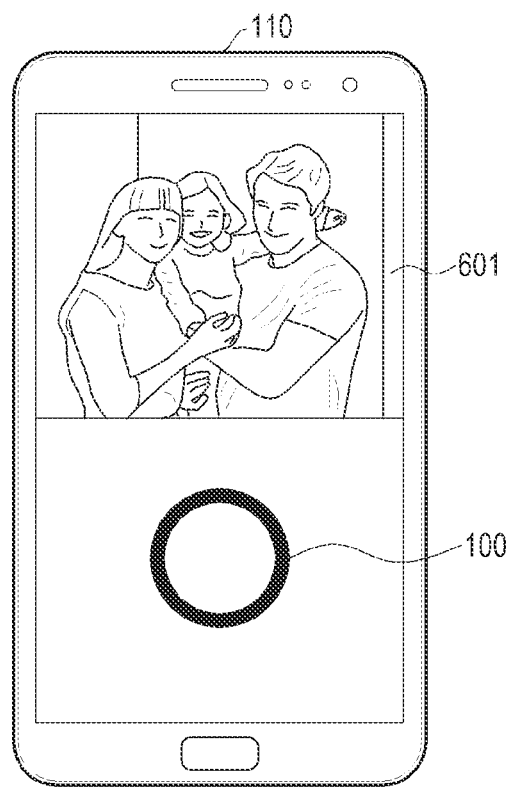
FIGS. 6A to 6E illustrate first screen data and second screen data corresponding to movement of a wearable device according to an embodiment of the present invention.

Referring to FIG. 6A, the portable terminal 110 recognizes that the wearable device 100 is placed thereon and displays first screen data 601 including information of the wearable device 100. The first screen data 601 may include the information of the wearable device 100, which may be information obtained by the wearable device 100. As illustrated in FIG. 6A, the obtained information may be, for example, image information that has been most recently obtained by the wearable device 100 or images that has been stored in the wearable device 100.

As another example, if the obtained information includes user-consumed calories, the consumed calories may be displayed in the first screen data 601.

Figure 6B:
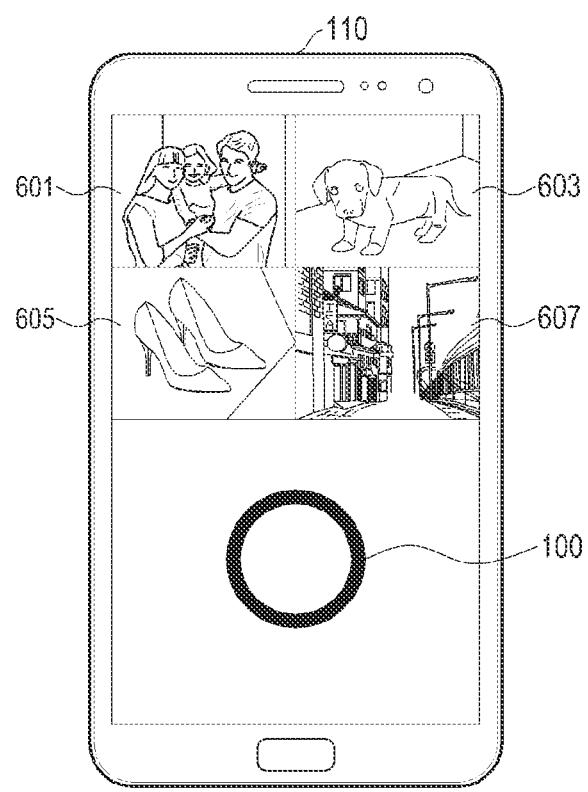

Referring to FIG. 6B, the portable terminal 110 recognizes that the wearable device 100 is placed thereon and displays first screen data 601, 603, 605, and 607 including information of the wearable device 100. The first screen data 601 may include the information of the wearable device 100, which may be information obtained by the wearable device 100. The obtained information may be, for example, information about Image 1 on the first screen data 601, Image 2 on the first screen data 603, Image 3 on the first screen data 605, and Image 4 on the first screen data 607, which are captured by the wearable device 100. The images included in the first screen data may be classified according to the times at which they are obtained or according to the places where the images are captured or persons in the images.

As another example, if the obtained information includes user-consumed calories and blood sugar levels, the calories and the blood sugar levels may be displayed in the first screen data.

Figure 6C:
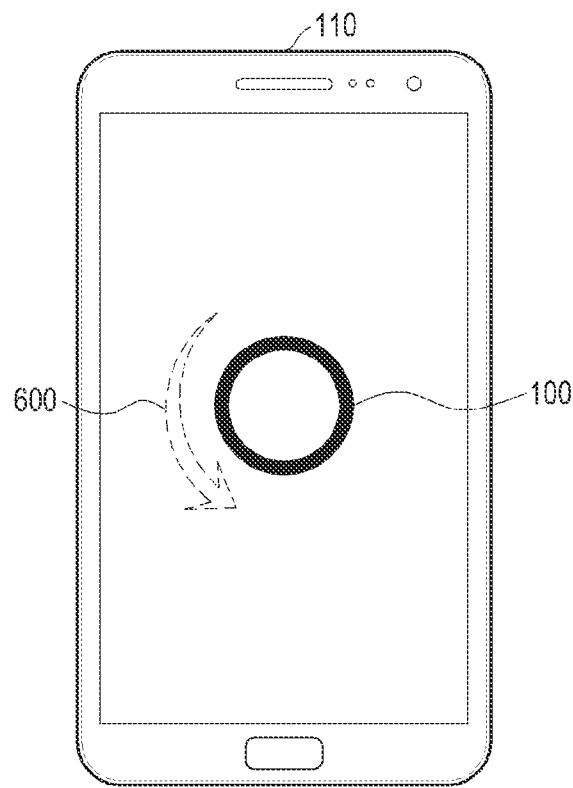

Referring to FIG. 6C, movement 600 of the wearable device 100 placed on the portable terminal 110 displaying the first screen data is provided. Although FIG. 6C illustrates an example in which the wearable device 100 rotates in a counterclockwise direction, the portable terminal 110 may also recognize clockwise rotation and display another screen data.

In accordance with another embodiment, as the position of the wearable device 100 is changed, the portable terminal 110 may display another screen data.

Figure 6D:
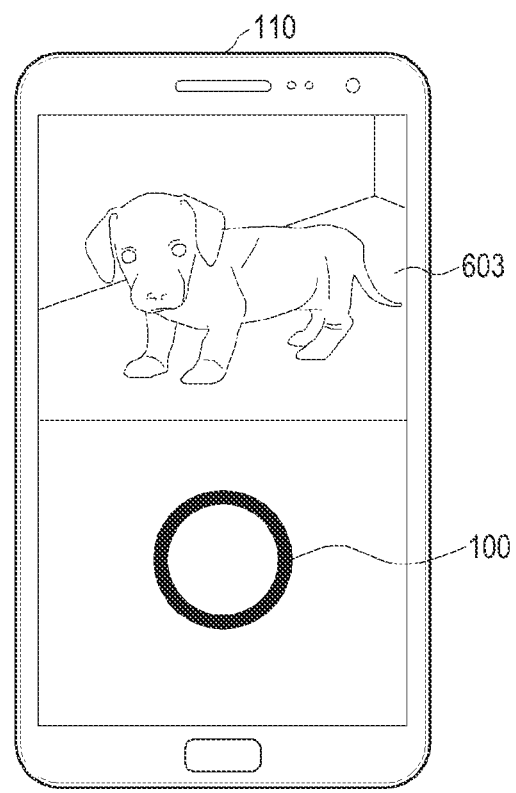

Referring to FIG. 6D, after the portable terminal 110 senses the movement 600 of the wearable device 100 in the first screen data illustrated in FIG. 6A, the portable terminal 110 displays second screen data 603. The second screen data 603 may include image information obtained prior to an image that has been most recently obtained by the wearable device 100, or the second screen data 603 may include an image that is different from the image included on the first screen data.

As another example, if the information obtained by the wearable device 100 includes user-consumed calories, the consumed calories are displayed in the first screen data, and the second screen 603 corresponding to movement may provide calories recommended to the user.

Figure 6E:
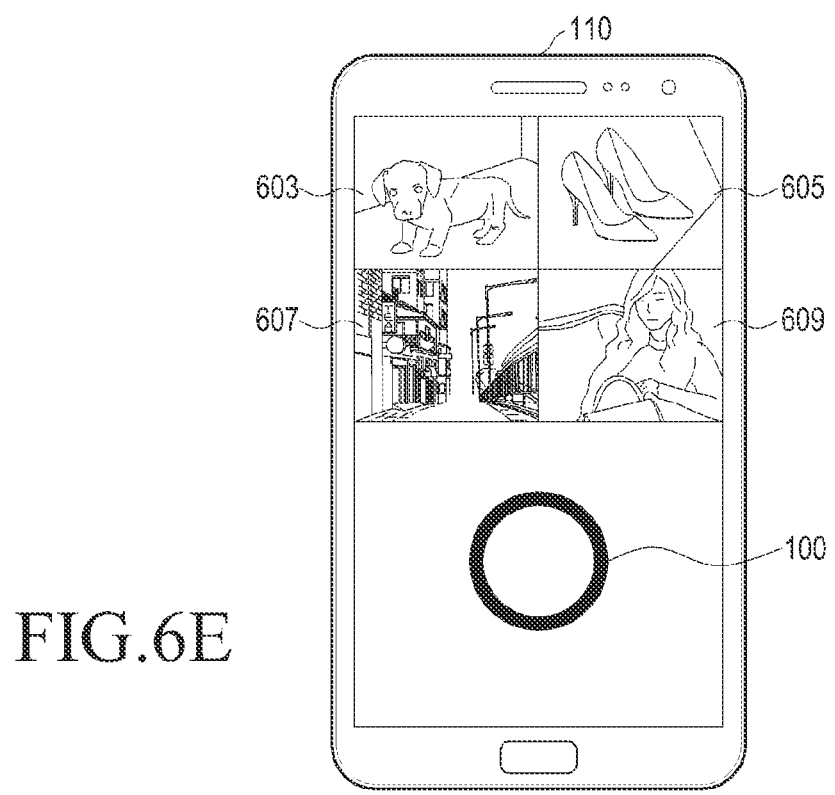

Referring to FIG. 6E, the portable terminal 110 senses movement 600 of the wearable device 100 in the first screen data illustrated in FIG. 6B, and displays second screens 603, 605, 607, and 609. For example, Image 2 displayed in the second screen 603, Image 3 displayed in the second screen 605, Image 4 displayed in the second screen 607, and Image 5 displayed in the second screen 609 may be image information obtained by the wearable device 100, after Image 1 displayed in the first screen data 601.

As another example, if the obtained information includes user-consumed calories and blood sugar levels, the consumed calories and the blood sugar levels may be displayed in the first screen data, and the second screen data may include calories and blood sugar levels recommended to users.

FIGS. 7A to 7E illustrate first screen data and second screen data that corresponds to movement of a wearable device according to another embodiment of the present invention. Specifically, in FIGS. 7A to 7E, the portable terminal 110 is assumed to sense movement of the wearable device 100 and perform a preset operation.

Figure 7A:
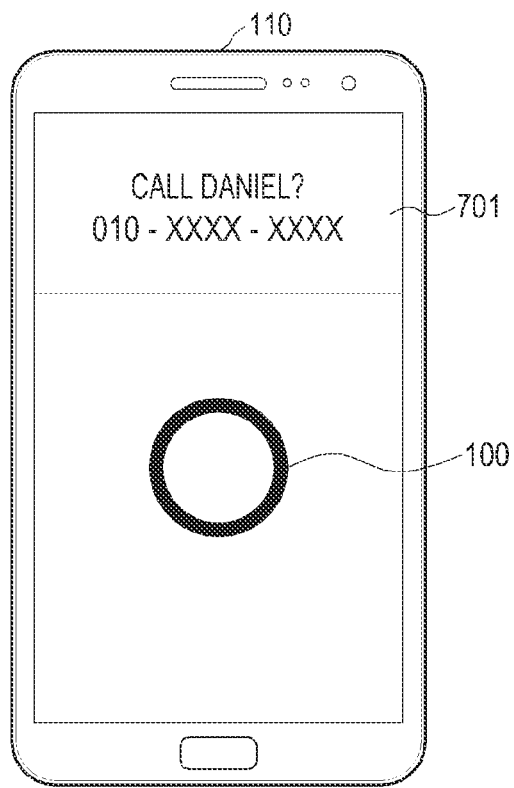
FIGS. 7A to 7E illustrate first screen data and second screen data corresponding to movement of a wearable device according to another embodiment of the present invention.

Referring to FIG. 7A, the portable terminal 110 recognizes the wearable device 100 and displays the first screen data 701 including the information of the wearable device 100. The first screen data 701 may include information of the wearable device 100, which may include information about functions set in the portable terminal 110.

As illustrated in FIG. 7A, the information about the functions set in the portable terminal 110 may include, for example, information about whether the portable terminal 110 is to make a call to a particular person. That is, upon recognizing the wearable device 100, the portable terminal 110 may provide first screen data 701 including text information "Call Daniel?", asking the user's intention.

Figure 7B:
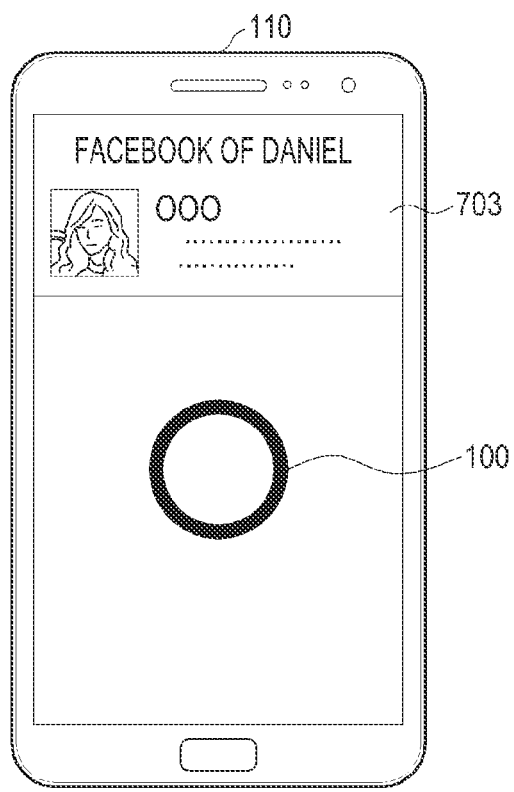

Referring to FIG. 7B, the portable terminal 110 recognizes the wearable device 100 and displays a first screen data 703 including information of the wearable device 100. The third screen data 703 may include the information of the wearable device 100, which may include information about functions set in the portable terminal 110.

As illustrated in FIG. 7B, the information about the functions set in the portable terminal 110 may include, for example, information about a screen image in which the portable terminal 110 visits a Facebook® page of a particular person. That is, upon recognizing the wearable device 100, the portable terminal 110 may provide the first screen data 703 including a screen image in which the portable terminal 110 automatically visits 'Facebook of Daniel'. Thus, the portable terminal 110 may provide a new interface through which the user may use the portable terminal 110.

Figure 7C:
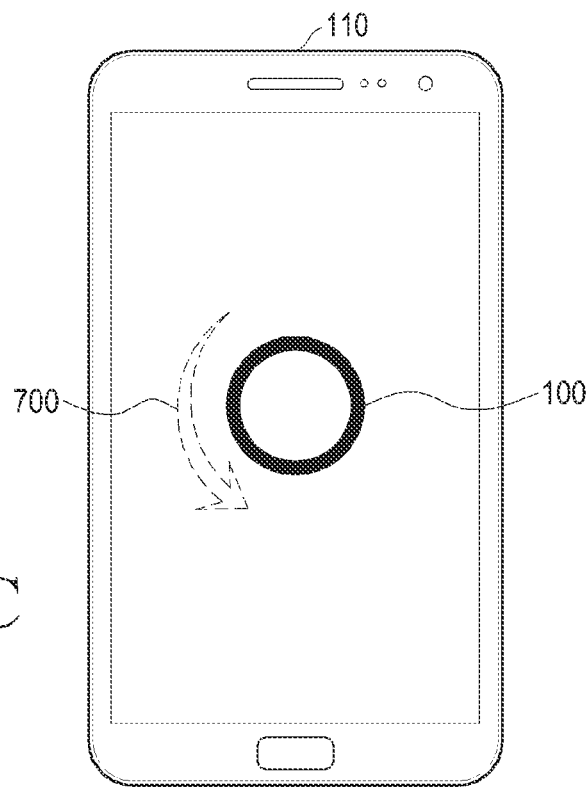

Referring to FIG. 7C, movement 700 of the wearable device 100 placed on the portable terminal 110 displaying the first screen data is illustrated. Although FIG. 7C illustrates an example in which the wearable device 100 rotates in a counterclockwise direction, the portable terminal 110 may recognize clockwise rotation and perform a set operation corresponding to the rotation.

As another example, as the position of the wearable device 100 is changed, the portable terminal 110 may perform another operation.

Figure 7D:
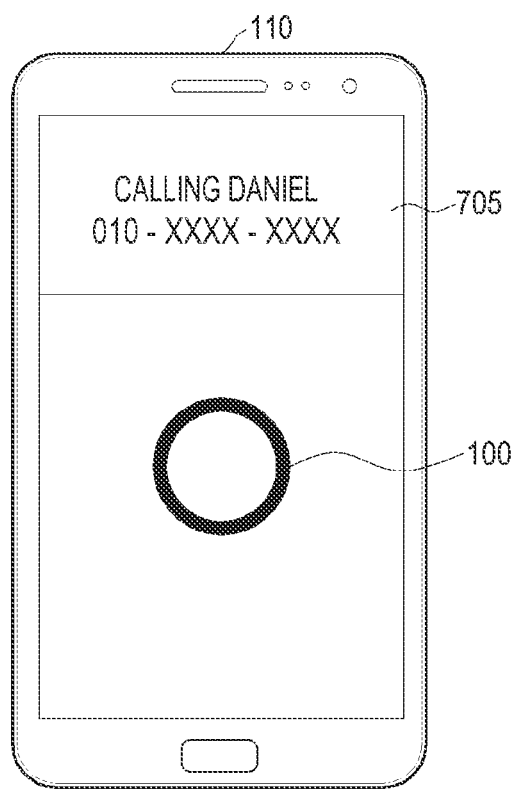

Referring to FIG. 7D, the portable terminal 110 senses the movement 700 of the wearable device 100 in the first screen data 701 illustrated in FIG. 7A and displays second screen data 705. For example, the second screen data 705 may include text information such as 'Calling Daniel', after receiving the user's intention regarding 'Call Daniel?' provided on the first screen data 701. That is, the second screen data may provide a preset operation of the portable terminal 110 corresponding to movement of the wearable device 100.

Figure 7E:
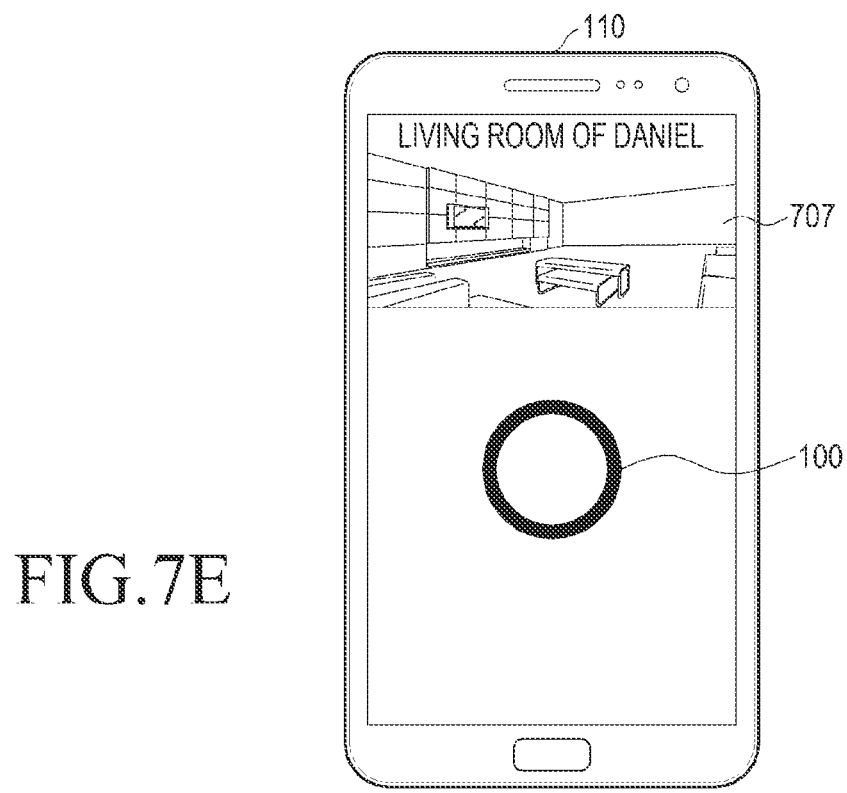

Referring to FIG. 7E, the portable terminal 110 senses the movement 700 of the wearable device 100 on the first screen data 703 illustrated in FIG. 7B and displays second screen data 707. For example, the second screen data 707 includes image information regarding 'Living Room of Daniel' in the first screen data, and the portable terminal 110 may display the second screen data 707 including the image information. That is, the second screen data may provide a preset operation of the portable terminal 110 corresponding to movement of the wearable device 100.

Figure 8:
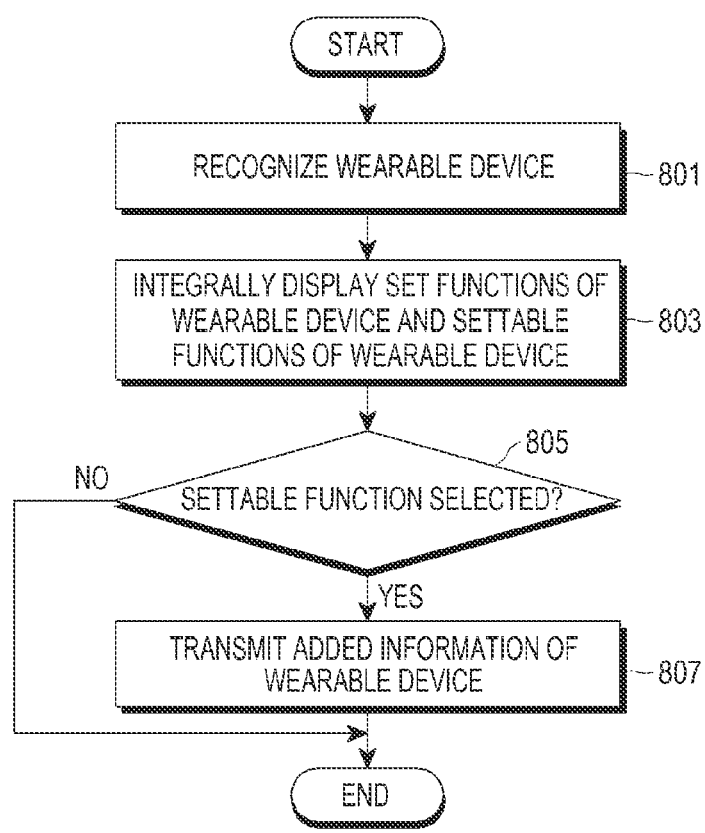
FIG. 8 is a flowchart illustrating an operation of a portable terminal according to an embodiment of the present invention.

FIG. 8 is a flowchart illustrating an operation of a portable terminal according to an embodiment of the present invention.

Referring to FIG. 8, in step 801, the portable terminal 110 recognizes the wearable device 100. For example, the portable terminal 110 detects that the wearable device 100 is placed on the touch screen 111 of the portable terminal 110 using a pressure sensor embedded in the portable terminal 110.

In step 803, the portable terminal 110 integrally displays functions that are set in the wearable device 100 and functions that are settable by the wearable device 100. The functions that are set in the wearable device 100 may include, for example, information about an electronic device type that is controllable by the wearable device 100 or information about an electronic device function that is controllable by the wearable device 100. The electronic device type may include a TV, a radio, blinds, living room lights, etc. For example, if the electronic device is a TV, the electronic device function may include channel change and volume control of the TV.

If the wearable device 100 is set to control the TV, the functions that are settable by the wearable device 100 may include blinds and living room lights. That is, screen data that may be displayed on the portable terminal 110, in step 803, may include a list of electronic devices the wearable device 100 may currently control and a list of other electronic devices the wearable device 100 may additionally control. The screen data that may be displayed by the portable terminal 110 may also include a list of detailed functions of the respective electronic devices. The detailed functions control the respective electronic devices in detail. For example, detailed functions may include channel change and volume control of the TV, ON-OFF control of the living room light, UP-DOWN control of the blinds, etc.

In step 805, the portable terminal 110 determines whether a function that is settable by the wearable device 100 is selected. For example, if functions that are settable by the wearable device 100 include blinds and living room lights, the portable terminal 110 may determine whether one of the settable functions is selected by the user. The user's selection may be made by the user touching a function that is settable by a corresponding electronic device in screen data displayed on the touch screen 111 of the portable terminal 110 or moving the wearable device 100 placed on the touch screen 111 of the portable terminal 110.

In step 807, the portable terminal transmits added information to the wearable device 100. For example, the user-selected function that is settable by the wearable device 100 may be transmitted to the wearable device 100 through the added information of the wearable device 100.

Figure 9A:
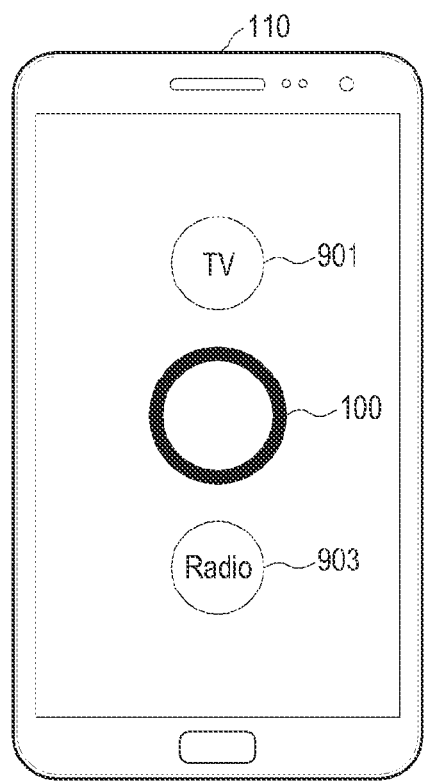
FIGS. 9A and 9B illustrate first screen data and second screen data according to an embodiment of the present invention.
Figure 9B:
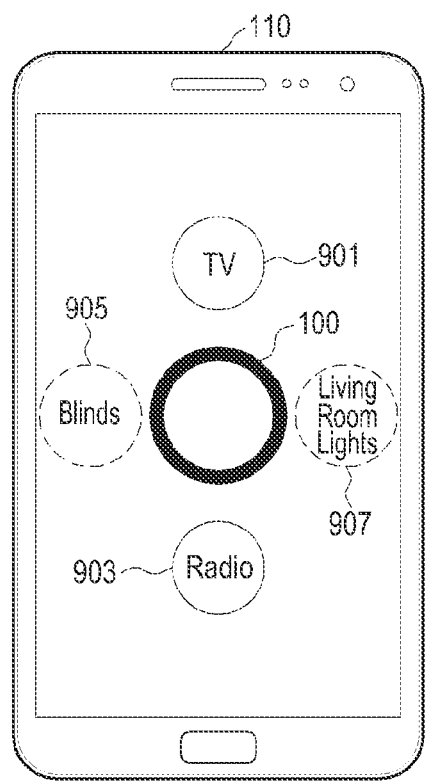

FIGS. 9A and 9B illustrate first screen data and second screen data according to an embodiment of the present invention.

Specifically, FIG. 9A illustrates first screen data including functions set in the wearable device 100.

Referring to FIG. 9A, the portable terminal 110 recognizes the wearable device 100 and displays a TV icon 901 and a radio icon 903 indicating functions set in the wearable device 100 in first screen data.

As another example, the portable terminal 110 may also display detailed functions of the TV icon 901 and the radio icon 903 in the first screen data.

FIG. 9B illustrates second screen data including functions that are set in the wearable device 100 and functions that are settable by the wearable device 100.

Referring to FIG. 9B, the portable terminal 110 recognizes the wearable device 100 and displays the TV icon 901 and the radio icon 903 as the functions set in the wearable device 100, and a blinds icon 905 and a living room lights icon 907 as the functions that are settable by the wearable device 100 in the first screen data.

As another example, the portable terminal 110 may also display detailed functions of the TV icon 901 and the radio icon 903 as the functions set in the wearable device 100 and detailed functions of the blinds icon 905 and the living room lights icon 907 as the functions that are settable by the wearable device 100 in the first screen data.

Figure 9C:
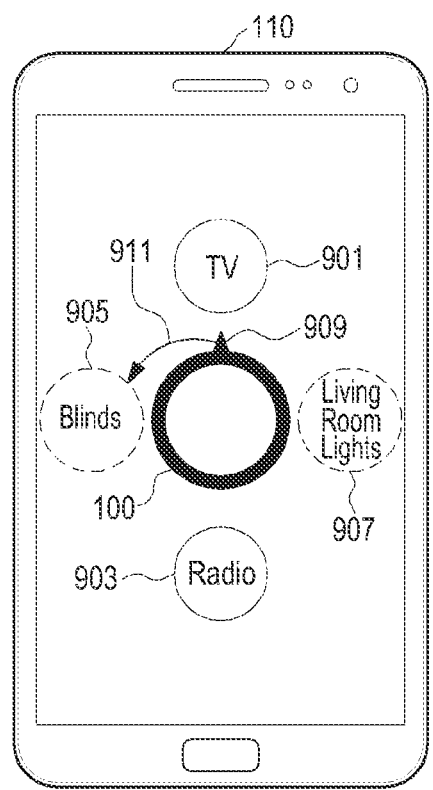
FIG. 9C is a diagram illustrating a method for setting a function of a wearable electronic device corresponding to movement of the wearable device according to an embodiment of the present invention.

FIG. 9C illustrates a method for setting a function of a wearable device corresponding to movement of the wearable device according to an embodiment of the present invention.

Referring to FIG. 9C, the portable terminal 110 recognizes the wearable device 100 and displays a menu including icons corresponding to the functions set in the recognized wearable device 100 and icons corresponding to at least one of the functions that are settable by the wearable device 100. The menu may include, for example, a TV icon 901, a radio icon 903, a blinds icon 905, and a living room lights icon 907, and the portable terminal 110 may set the wearable device 100 to control at least one of the TV, the radio, the blinds, and the living room lights, corresponding to an input.

For example, the portable terminal 110 may recognize movement of the wearable device 100 and may set a function of the wearable device 100 corresponding to the movement. In this case, the portable terminal 110 may display an indicator 909 indicating movement 911 of the wearable device 100 together with the menu. The movement 911 may include, for example, rotation of the wearable device 100 and a touch action on a particular region of the wearable device 100. The particular region may be a top surface of the wearable device 100 corresponding to positions of the function icons displayed on the portable terminal 110.

As another example, upon recognizing an input action with respect to a particular icon on the displayed menu, the portable terminal 110 may set the particular function in the wearable device 100 or may change an existing set function of the wearable device 100 into a function corresponding to the particular icon. The input action may be, for example, user's touching the particular icon displayed on the screen of the portable terminal 110, and in another example, the user may rotate the wearable device 100 to set a particular function of the wearable device 100 to a function corresponding to a menu or icon indicated by the indicator 909.

As another example, if the portable terminal 110 recognizes an input action with respect to a particular icon on a displayed menu, a particular function may be set in the portable terminal 110 or the existing set function of the portable terminal 110 may be changed to a function corresponding to the particular icon. The input action may be, for example, user's touching the particular icon displayed on the screen 111 of the portable terminal 110, and in another example, the user may rotate the wearable device 100 to set a particular function of the wearable device 100 to a function corresponding to a menu or icon indicated by the indicator 909.

Figure 10:
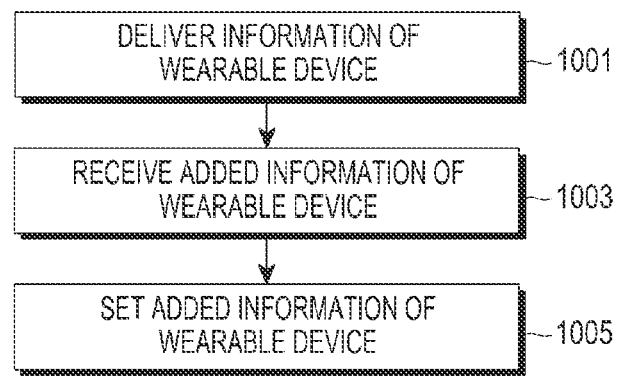
FIG. 10 is a flowchart illustrating an operation of a wearable device according to an embodiment of the present invention.

FIG. 10 is a flowchart illustrating an operations of a wearable device according to an embodiments of the present invention.

Referring to FIG. 10, in step 1001, the wearable device 100 delivers information of the wearable device 100 to the portable terminal 110. For example, the information of the wearable device 100 may include at least one of information obtained by the wearable device 100, information about functions set in the wearable device 100, and information about functions set in the portable terminal 110.

In step 1003, the wearable device 100 receives added information of the wearable device 10 from the portable terminal 110. For example, if a peripheral electronic device that is controllable by the wearable device 100 is a TV, the portable terminal 110 may recognize a radio as another electronic device that the wearable device 100 may also control. The portable terminal 110 may then transmit information for control of the radio by the wearable device 100 to the wearable device 100. That is, added information may include the information for control of the radio by the wearable device 100.

In step 1005, the wearable device 100 sets the added information of the wearable device 100, which is received from the portable terminal 110. For example, if the received added information includes the information for control of the radio by the wearable device 100, the wearable device 100 may be set to control the radio.

As another example, the information of the wearable device 100 may include a list of at least other electronic devices that are controllable by the portable terminal 110 and functions that are set in the portable terminal 110. The functions set in the portable terminal 110 may include information about an electronic device type or an electronic device function that may be controlled by the portable terminal 110. The electronic device type may include a TV, a radio, blinds, living room lights, etc. The electronic device function may include channel chance and volume control of a TV, if the electronic device is the TV.

Accordingly, the portable terminal 110 may set an electronic device type or an electronic device function that are controllable by the portable terminal 110, according to an input received from the wearable device 100.

Figure 11:
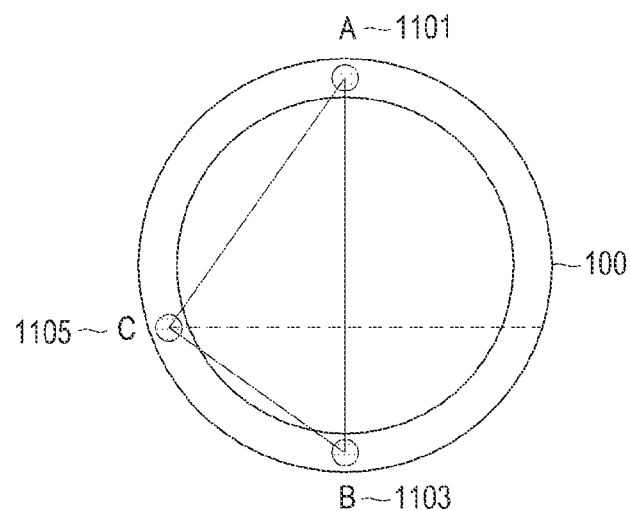
FIG. 11 illustrates a relationship between a wearable device and sensors embedded in the wearable device according to an embodiment of the present invention.

FIG. 11 illustrates a relationship between a wearable device and sensors embedded in the wearable device according to an embodiment of the present invention.

Referring to FIG. 11, the wearable device 100 is a smart ring including a sensor A 1101, a sensor B 1103, and a sensor C 1105. The positions of the sensor A 1101 and the sensor B 1103 may be top and bottom portions or left and right portions with respect to the center of the smart ring, and the sensor C 1105 may be embedded in an arbitrary position at which movement, a screen direction, and a rotation angle may be measured. In this case, a diagram formed by linearly connecting the sensor A 1101, the sensor B 1103, and the sensor C 1105 may be a right-angle triangle. The portable terminal 110 recognizes an angle the right-angle triangle rotates to recognize the rotation angle of the wearable device 100, determines the rotation as movement of the wearable device 100, and displays a corresponding screen.

As is apparent from the foregoing description, by providing an interface between the wearable device and the portable terminal, users may recognize information obtained by the wearable device through the screen of the portable terminal.

Moreover, as the portable terminal operates corresponding to movement of the wearable device, users may intuitively control the portable terminal.

While the present invention has been particularly shown and described with reference to certain embodiments thereof, various changes in form and detail may be made therein without departing from the spirit and scope of the present invention as defined by the following claims and any equivalents thereto.

What is claimed is:

1. A method for a portable terminal to interwork with a wearable device on the portable terminal, the method comprising:
   recognizing that the wearable device is placed on the portable terminal;
   displaying first screen data including information of the wearable device;
   sensing movement of the wearable device placed on the portable terminal; and
   displaying second screen data corresponding to the movement of the wearable device on the portable terminal.

2. The method of claim 1, further comprising:
   identifying a selection of one of functions that are settable by the wearable device and are included in the second screen data; and
   transmitting added information including information about the selected function to the wearable device.

3. The method of claim 1, wherein recognizing that the wearable device is placed on the portable terminal comprises recognizing that the wearable device is placed on a display of the portable terminal using a pressure sensor of the portable terminal.

4. The method of claim 1, wherein the information of the wearable device includes at least one of information obtained by the wearable device and information about functions that are set in the wearable device.

5. The method of claim 1, further comprising:
   obtaining update information of the wearable device from a server; and
   delivering the update information to the wearable device.

6. The method of claim 1, further comprising:
   releasing the portable terminal from a lock state, upon recognizing that the wearable device is placed on the portable terminal while the portable terminal is in the lock state; and
   displaying screen data indicating that the lock state of the portable terminal has been released.

7. The method of claim 6, further comprising:
   resetting the lock state of the portable terminal in response to the to the movement; and
   displaying screen data indicating that the lock state of the portable terminal is reset.

8. The method of claim 1, wherein the information of the wearable device includes a list of at least one other electronic devices that are controllable by the portable terminal, and
   wherein the second screen data corresponding to the movement includes screen data that is set to control an electronic device of the list.

9. The method of claim 1, further comprising:
   controlling another electronic device according to the movement of the wearable device,
   wherein the second screen data indicates a state of the another electronic device.

10. The method of claim 1, wherein sensing the movement of the wearable device comprises:
    sensing a rotation angle through which the wearable device moves at least one sensor included in the wearable device; and
    comparing the sensed rotation angle with a set rotation angle.

11. The method of claim 1, wherein the first screen data further includes a list of functions that are set in the wearable device, and
    wherein the second screen data includes a screen image in which the set function is selected corresponding to the movement.

12. The method of claim 1, wherein the first screen data displays a menu including at least one of functions that are set in the recognized wearable device and functions that are settable by the wearable device, and
    wherein the second screen data displays an icon indicating a function selected from the menu, corresponding to the movement.

13. A method for a portable terminal to interwork with a wearable device on the portable terminal, the method comprising:
    recognizing that the wearable device is placed on the portable terminal;
    displaying screen data including at least one of functions that are set in the wearable device and functions that are settable by the wearable device;
    determining whether a function that is settable by the wearable device is selected through movement of the wearable device placed on the portable terminal; and
    transmitting, to the wearable device, added information corresponding to the selected function.

14. The method of claim 13, wherein recognizing that the wearable device is placed on the portable terminal comprises recognizing that the wearable device is placed on a screen of the portable terminal using a pressure sensor of the portable terminal.

15. The method of claim 13, further comprising:
    obtaining update information of the wearable device from a server; and
    delivering the update information to the wearable device.

16. A portable terminal that interworks with a wearable device on the portable terminal, the portable terminal comprising:
    a controller configured to recognize that the wearable device is placed on the portable terminal and sense movement of the wearable device placed on the portable terminal; and
    a screen configured to display first screen data including information of the wearable device and second screen data corresponding to the movement.

17. The portable terminal of claim 16, wherein the controller identifies a selection of one of functions that are settable by the wearable device and are included in the second screen and controls a communication unit to transmit added information including information about the selected function to the wearable device.

18. The portable terminal of claim 16, further comprising a pressure sensor configured to recognize that the wearable device is placed on a screen of the portable terminal.

19. The portable terminal of claim 16, wherein the information of the wearable device includes at least one of information obtained by the wearable device and information about functions that are set in the wearable device.

20. The portable terminal of claim 16, further comprising a transceiver configured to obtain update information of the wearable device from a server and deliver the update information to the wearable device.

21. The portable terminal of claim 16, wherein the controller displays screen data indicating that a lock state of the portable terminal is released on the screen, when the wearable device is recognized as being placed on the portable terminal while the portable terminal is in the lock state.

22. The portable terminal of claim 21, wherein the controller displays screen data indicating that the lock state of the portable terminal is reset on the screen, corresponding to the movement.

23. The portable terminal of claim 16, wherein the information of the wearable device includes a list of at least one other electronic devices that are controllable by the portable terminal, and
wherein the second screen data corresponding to the movement includes screen data that is set to control an electronic device of the list.

24. The portable terminal of claim 16, wherein the controller controls another electronic device according to the movement of the wearable device, and
wherein the second screen data indicating a state of the another electronic device on the screen.

25. The portable terminal of claim 16, wherein the controller senses a rotation angle through which the wearable device moves using at least one sensor included in the wearable device and compares the sensed rotation angle with a set rotation angle.

26. The portable terminal of claim 16, wherein the first screen data further includes a list of functions that are set in the wearable device, and
wherein the second screen data includes a screen image in which the set function is selected corresponding to the movement.

27. The portable terminal of claim 26, wherein the controller obtains update information of the wearable device from a server and delivers the update information to the wearable device.

28. The portable terminal of claim 16, wherein the controller recognizes the wearable device placed on the portable terminal, displays screen data including functions that are set in the wearable device and at least one of functions that are settable by the wearable device on the screen, determines whether one of the functions that are settable by the wearable device is selected corresponding to movement of the wearable device, and transmits added information including information about the selected function to the wearable device.

29. The portable terminal of claim 28, wherein the controller recognizes that the wearable device is placed on a screen of the portable terminal using a pressure sensor included in the portable terminal.

30. The portable terminal of claim 16, wherein the first screen data displays a menu including at least one of functions that are set in the recognized wearable device and functions that are settable by the wearable device, and
wherein the second screen data displays an icon indicating a function selected from the menu, corresponding to the movement.

* * * * *